(12) United States Patent
Bai et al.

(10) Patent No.: US 8,475,064 B2
(45) Date of Patent: Jul. 2, 2013

(54) CAMERA BLADE DRIVE DEVICE

(76) Inventors: Longji Bai, Tokyo (JP); Masatoshi Uemura, Tokyo (JP)

( * ) Notice: Subject to any disclaimer, the term of this patent is extended or adjusted under 35 U.S.C. 154(b) by 26 days.

(21) Appl. No.: 13/240,292

(22) Filed: Sep. 22, 2011

(65) Prior Publication Data

US 2012/0076486 A1    Mar. 29, 2012

(30) Foreign Application Priority Data

Sep. 28, 2010  (JP) ................................. 2010-217727

(51) Int. Cl.
  *G03B 9/08*    (2006.01)
(52) U.S. Cl.
  USPC .......................................................... 396/463
(58) Field of Classification Search
  USPC ......................................... 396/455, 463, 464
  See application file for complete search history.

(56) References Cited

U.S. PATENT DOCUMENTS

| 4,390,262 | A  | * | 6/1983  | Hirohata et al. | 396/449 |
| 6,382,848 | B1 | * | 5/2002  | Nakano          | 396/464 |
| 2002/0149290 | A1 | * | 10/2002 | Kurosu et al. | 310/261 |
| 2004/0131349 | A1 | * | 7/2004  | Kurosu et al. | 396/463 |

FOREIGN PATENT DOCUMENTS

JP    62-80636    4/1987

\* cited by examiner

*Primary Examiner* — Rodney Fuller
(74) *Attorney, Agent, or Firm* — Wenderoth, Lind & Ponack, L.L.P.

(57) ABSTRACT

A camera blade drive device includes a base plate 10 that has an aperture 10a forming an optical path, a blade member 20 that is supported by the base plate 10 and opens or closes the aperture 10a, and a driving ring 30 provided to rotate relative to the base plate 10. The camera blade drive is configured to operate the blade member 20 that is linked to the rotating driving ring 30. A permanent magnet 31 is provided on the driving ring 30 and a coil 11 rotates the driving ring 30 by magnetic force generated when the coil 11 is conducting. A magnetic member 12 holds the driving ring 30 in a predetermined position by magnetic attraction with the permanent magnet 31 when the coil 11 is non-conducting.

11 Claims, 5 Drawing Sheets

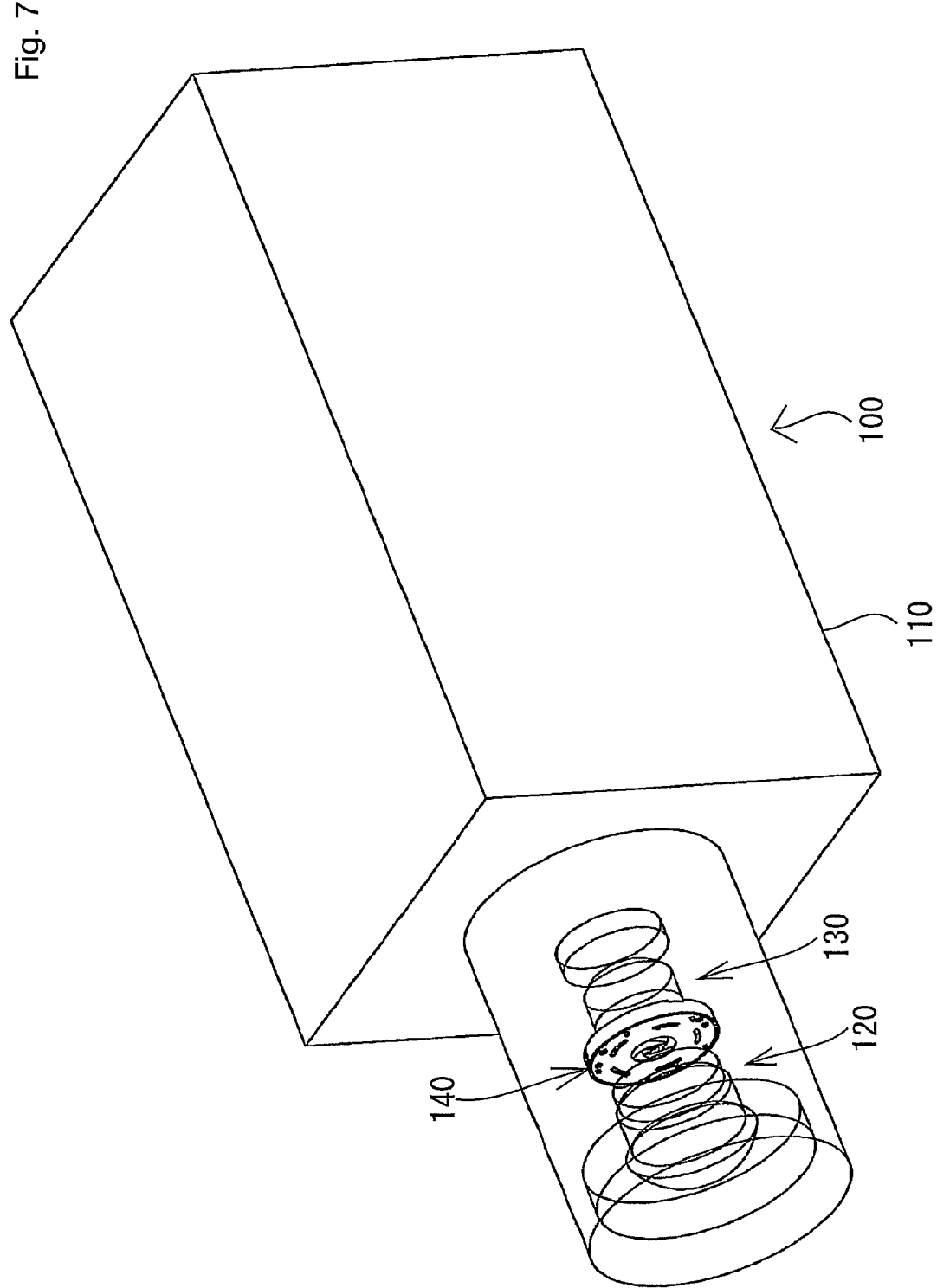

CAMERA BLADE DRIVE DEVICE

FIELD OF THE INVENTION

The present invention relates to a camera blade drive device that drives shutter blades, diaphragm blades, or other blade members in a camera.

BACKGROUND OF THE INVENTION

Conventionally, inventions of this type are formed in an annular shape with radially-polarized multipole magnetic properties and include a permanent magnet rotor having grooved cams on the multipole magnetic surface, two stator units that are provided to sandwich the rotor, and blade members that engage the grooved cams, and are configured to open and close the blade members by the grooved cams while the permanent magnet rotor rotates when the stator units are conducting (For example, refer to Patent Document 1).

According to the conventional technology, the blade members are adjusted to produce the desired opening by controlling the pulse power supplied to the stator units to rotate the permanent magnet rotor to a predetermined angle of rotation.

However, the use of a multipole-magnetic annular rotor and two stators as well as the machining of grooves on the rotor surface and other techniques in the conventional technology require complex configuration and machining, which tend to drive up costs and result in oversized configurations.

Also, with the conventional technology, it is not possible to hold the blade members in a predetermined position when non-conducting, which leaves room for improvement in applications for digital cameras and digital video cameras. In other words, in order to protect charge-coupled devices (CCD) and complementary metal-oxide semiconductors (CMOS), it is desirable for blade members to be fully closed in the default conditions prior to the input of electrical power. However, with the conventional technology, it has not been possible to hold blade members in the fully-closed condition when non-conducting.

PATENT LITERATURE

[Patent document 1] Japanese Patent Laid-Open No. 62-80636

PROBLEMS TO BE SOLVED BY THE INVENTION

The present invention represents a solution to the problems inherent in the above described circumstances by providing a camera blade drive device that actuates blade members through a compact and simple structure and is also capable of holding the blade members in a set position when non-conducting.

SOLUTIONS TO PROBLEMS

In order to overcome the problem described above, the present invention provides a camera blade drive device. The camera blade drive device includes a base plate having an aperture for an optical path, a blade member that is supported by the base plate and operates so as to open and close the aperture and a driving ring configured to rotate relative to the base plate, wherein the blade member is linked and operated by the driving ring that is rotating the driving ring is provided with a permanent magnet and the base plate is provided with a coil that generates an electromagnetic force by conducting and a magnetic member that attracts the permanent magnet, and the driving ring is held in a predetermined position by a magnetic force generated between the permanent magnet and the magnetic member when the coil is non-conducting.

According to specially preferable embodiment, the permanent magnet is attracted by the magnetic member and the blade member is held in either a fully-closed or fully-opened condition when the coil is non-conducting.

In addition, in order to improve static stability of the blade members in either the fully-closed or fully-opened condition, the permanent magnet is attracted by the magnetic member and the operation of the blade member in either an opening or closing direction is regulated by a regulating part provided on the base plate, and the blade member is held in either a fully-closed or fully-opened condition when the coil is non-conducting.

In addition, in order to strengthen the rotational torque of the driving ring by the relatively small structure, a plurality of groups including the permanent magnet, the coil, and the magnetic member are provided around the circumference of the driving ring.

In addition, in order to provide favorable rotational balance of the driving ring, the plurality of groups including the permanent magnet, the coil, and the magnetic member are provided so that at least one of the groups and the other groups sandwich the aperture and each of the groups does not interfere with a support point of the blade member.

ADVANTAGES OF THE INVENTION

The present invention, as described in the above explanation, exhibits the following effects.

When the coils are conducting, electromagnetic force generated by the coils cause the driving ring and permanent magnets to rotate, which actuates the blade members that are linked to the rotating driving ring. Also, when the coil is non-conducting, the permanent magnets are attracted to the magnetic members, which is capable of holding the driving ring and the blade members in a predetermined position.

Thus, the blade members are actuated through a compact and simple structure, which is also capable of holding the blade members in a set position when non-conducting.

BRIEF DESCRIPTION OF THE DRAWINGS

FIG. 7 is a perspective view of an example of an application to a surveillance camera of the camera blade drive device according to the present invention.

DESCRIPTIONS OF THE INVENTION

Figure 1:
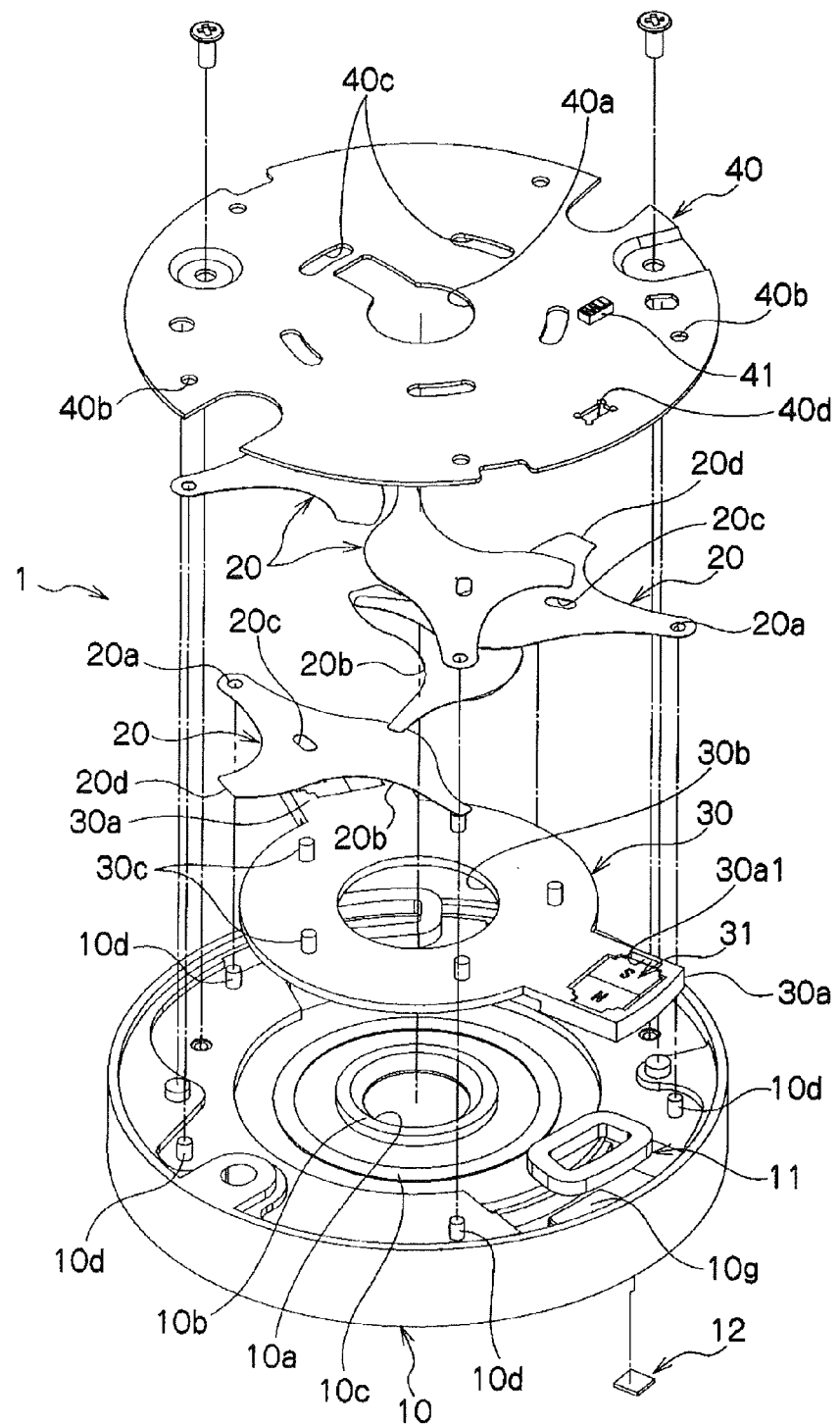
FIG. 1 is an exploded perspective view of an example of a camera blade drive device according to the present invention.

The following is an explanation of an embodiment of the invention with reference to the drawings.

FIGS. 1-6 show an example of an application of the camera blade drive device according to the present invention to a diaphragm device for a camera.

Camera blade drive device 1 includes a base plate 10 that has an aperture 10a that functions as an optical path, a plurality of blade members 20 (five, according to the example in the drawings) that are supported by the base plate 10 and open or close the aperture 10a, a driving ring 30 provided to rotate relative to the base plate 10, and a cover 40 provided to enclose the blade members 20 and the driving ring 30 between itself and the base plate 10, and is configured to enable the opening and closing of the plurality of blade members 20 that are linked to the rotating driving ring 30.

Also, the camera blade drive device 1 is provided with a coil 11 and a magnetic member 12 on the base plate 10 as well as a permanent magnet 31 on the driving ring 30. The camera blade drive device 1 is configured so that when the coil 11 is conducting, the driving ring 30 is rotated by electromagnetic force produced between the coil 11 and the permanent magnet 31, and when the coil 11 is non-conducting, the driving ring 30 is held in a predetermined position by magnetic attraction produced between the permanent magnet 31 and the magnetic member 12.

More specifically, the base plate 10 is made of synthetic resin materials and is formed in the shape to a disc having in the center the aperture 10a that lies in the optical path.

Along the circumference of aperture 10a on one side of the base plate 10 is provided an annular rail 10c that reduces frictional resistance between the driving ring 30 and an annular axis 10b that is the axis of rotation of the driving ring 30.

The annular axis 10b is an annular protrusion that protrudes toward the optical axis along the inner edge of the aperture 10a, mates with the inner surface of the driving ring 30, and supports the driving ring 30 in a freely rotatable manner.

The annular rail 10c is an annular protrusion provided on the perimeter of an annular protrusion 11, and reduces frictional resistance with the driving ring 30 during partial contact in the radial direction. The annular rail 10c can be replaced by a plurality of protrusions disposed at intervals along the circumference.

In addition, formed along the perimeter of the annular rail 10c on the base plate 10 are supporting axes 10d, which pass through an opening in the blade members 20, and two types of regulating part, regulating parts 10e and regulating parts 10f (Refer to FIGS. 2, 4, and 5.), which regulate the opening and closing of the blade members 20.

The supporting axes 10d are cylindrical protrusions, a plurality of the supporting axes 10d (five, according to the example in the drawings) are provided along the perimeter of the aperture 10a at uniform intervals along the circumference.

One of the regulating parts, regulating part 10e, is a wall surface, substantially perpendicular to the surface of the base plate 10, which touches a protruding part 30a of the driving ring 30 when the blade members 20 are fully opened and regulates the turning in the closing direction of the driving ring 30.

The other of the regulating parts, regulating parts 10f, is a protrusion protruding from the surface of the base plate 10, which touch the blade members 20 when the blade members 20 are fully closed and regulate the turning in the closing direction of the blade members 20.

This regulating part 10f may be provided for each of the blade members 20, but it is not necessary to do so. To improve static stability when in fully-closed condition, however, it is desirable that no fewer than half the blade members 20 (three, according to the example in the drawings) be provided with a regulating part 10f.

According to the example in the drawings, the regulating parts 10f are each located between two supporting axes 10d adjacent to each other along the circumference, with one of them provided on the opposite side of the aperture 10a from the other two.

And, on the surface of the base plate 10 that faces the driving ring 30, a plurality of coils 11 (two, according to the example in the drawings) are fixed, and on the opposite surface, an equal number of magnetic members 12 are fixed.

The coils 11 are conductive wire, wound into a substantially rectangular shape having a hollow core. The example in the drawings shows that positioning is done by mating the hollow core with a protrusion 10g formed in the surface of the base plate 10 and fixing the coils 11.

Figure 2:
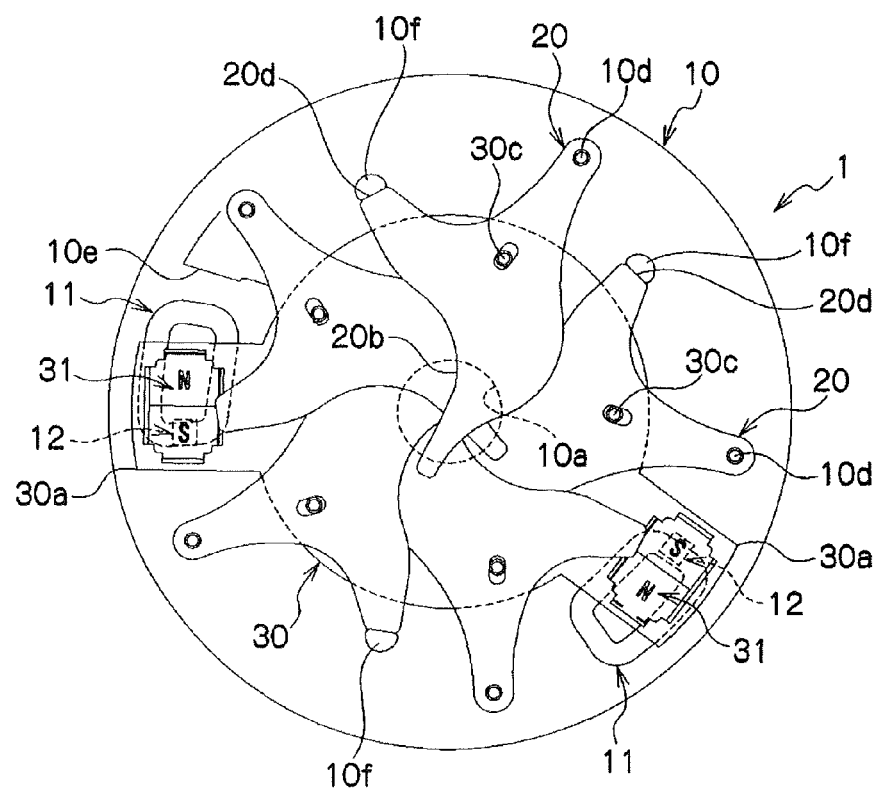
FIG. 2 is a plan view of the camera blade drive device of FIG. 1 in the fully-closed condition.
Figure 3:
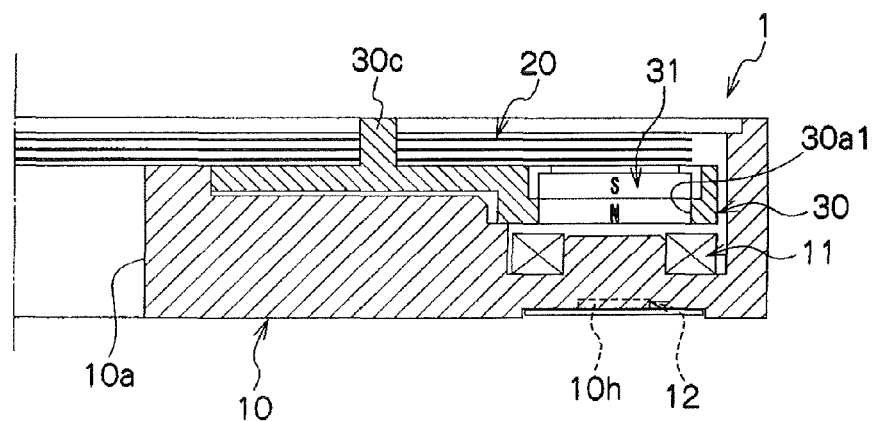
FIG. 3 is a sectional view of the camera blade drive device of FIG. 1.
Figure 4:
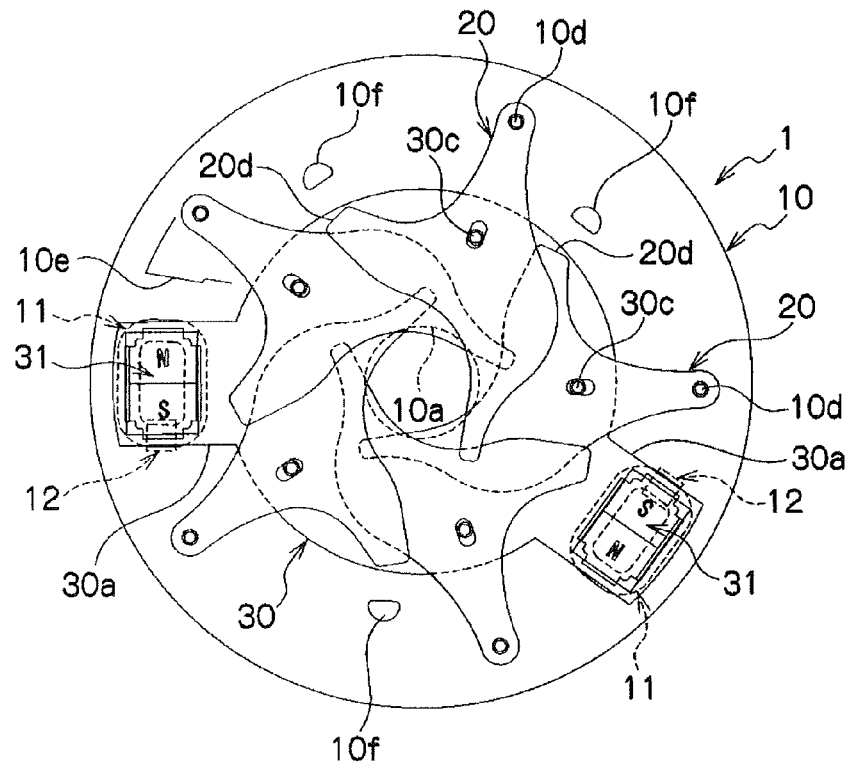
FIG. 4 is a plan view of the camera blade drive device of FIG. 1 in a partially-opened condition.
Figure 5:
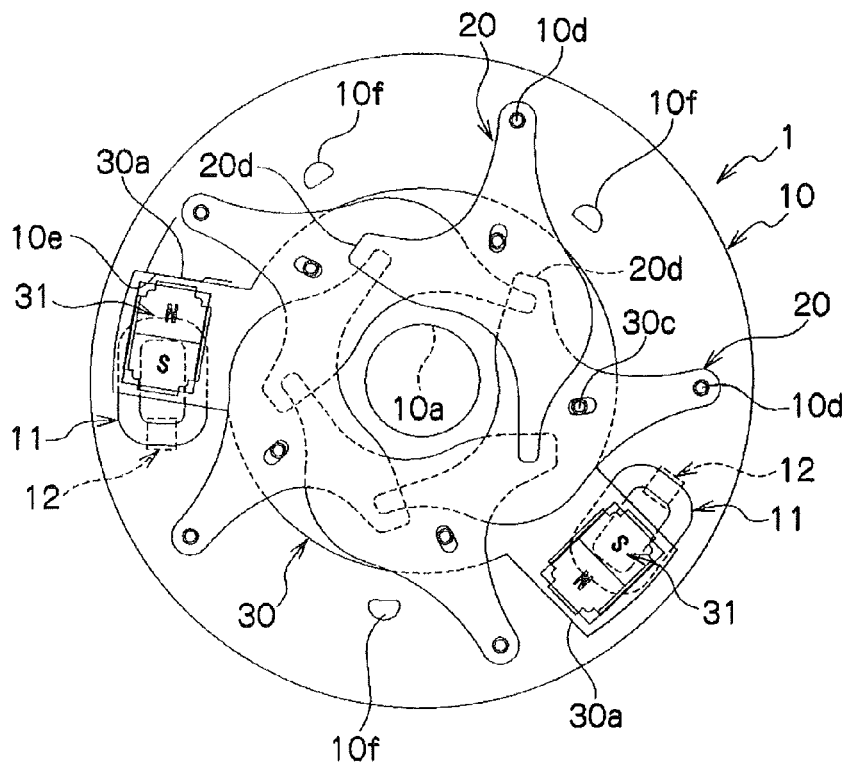
FIG. 5 is a plan view of the camera blade drive device of FIG. 1 in the fully-opened condition.

According to the example in the drawing, the two coils 11 are located on opposite sides of the aperture 10a and provided not to interfere with the support points (supporting axis 10d) for the blade members 20 as well as the regulating parts 10f (Refer to FIGS. 2, 4, and 5).

However, it is desirable that the coils 11 be substantially trapezoidal in shape, with the sides that extend radially along the radius being of equal length and the sides that extend circumferentially being of unequal length, with the distal side being longer than the proximal side.

Also, the magnetic members 12 are slab-shaped members made of a magnetic body such as iron, nickel, chrome oxide, cobalt, or ferrite, which is positioned in a cavity 10h (Refer to FIG. 3.) formed in the reverse side of the base plate 10.

The position of magnetic members 12 are set so that magnetic attraction with the permanent magnet 31 of the driving ring 30 engages the blade members 20 with the driving ring 30 and holds the blade members 20 in the fully-closed condition when the coils 11 are non-conducting. To make an even more detailed explanation of the example in the drawings, the magnetic members 12 are provided to face a conductive wire 11a of the coils 11 in the closing-direction of rotation for the driving ring 30 (The right-hand end according to FIG. 6) (Refer to FIGS. 2, 4, and 5).

Also, the driving ring 30 is a substantially annular-shaped slab made of synthetic resin materials and has an axial hole 30b that mates with the annular axle 10b of the base plate 10. The circumference of driving ring 30 has a plurality of protruding parts 30a (two, according to the example in the drawings) protruding distally. Also, the surface of the driving ring 30 that faces away from the base plate is provided with a plurality of driving protrusions 30c to engage the blade members 20.

The protruding parts 30a are provided with a mating hole 30a1. The permanent magnet 31 mates with the mating hole 30a1. The protruding parts 30a and the permanent magnet 31 are provided in a number equal to the number of coils 11 and in an arrangement facing the coils 11 respectively.

A plurality of driving pins 30c (five, according to the example in the drawings) are provided at even intervals along the circumference of the driving ring 30. The driving pins 30c are cylindrical protrusions that insert loosely into the blade members 20 as described below.

Figure 6:
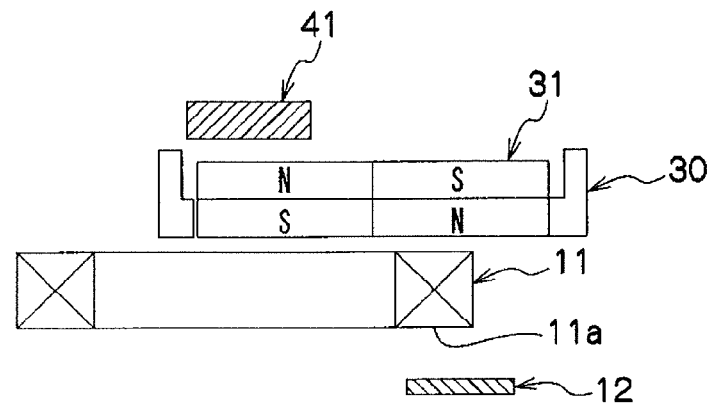
FIG. 6(*a*), FIG. 6(*b*), and FIG. 6(*c*) are sectional views of the camera blade drive device of FIG. 1, showing the positional relationship between the permanent magnet, coil, and magnetic member.
Figure 6:
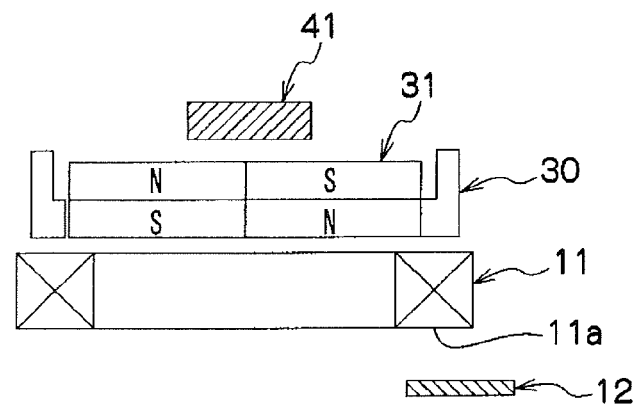
Figure 6:
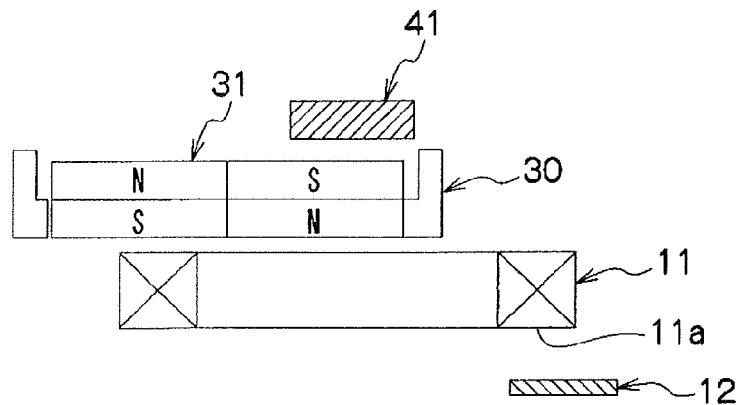

The permanent magnet 31 is pair of permanent magnets and configured so that not only do the obverse and reverse sides have opposing polarities but one driving direction and the other driving direction also have opposing polarities, as shown in FIG. 6.

The magnetic force of the permanent magnet 31 is set as appropriate so that when the coils 11 are non-conducting while the blade members 20 are in the fully-opened condition (Refer to FIG. 5.), the magnetic attraction produced between the permanent magnet 31 and the magnetic members 12 rotates the driving ring 30 so that the blade members 20 close fully.

Also, blade members 20 are thin plate-shaped members, having at one end the round axial hole 20a, through which the supporting axis 10d passes, and at another end a light-blocking part 20b that faces the aperture 10a and changes the open area of the aperture 10a.

Between the axial holes 20a and the light-blocking parts 20b of the blade members 20, a slot-shaped driving hole 20c is provided to engage the driving pins 30c of the driving ring 30. The driving holes 20c are oriented so that the slot shape intersects the direction of movement of the driving pins 30c and enables each of the blade members 20 to rotate smoothly while following the arc-shaped movement of the driving pins 30c.

In addition, the blade members 20 is provided with a regulating protrusion 20d on the side of closing rotation direction. The regulating protrusion 20d regulates the rotation of the blade members 20 in the closing direction by touching the regulating parts 10f of the base plate 10 when the blade members 20 rotate in the closing direction.

Only some of the plurality of blade members 20 (five, according to the example in the drawings), actually touch the regulating protrusions 20d (three, according to the example in the drawing). Rotation in the closing direction of the other blade members 20 is regulated by linking them via the driving ring 30 to the blade members 20 that actually touch the regulating protrusions 20d.

Also, the cover 40 is a disc-shaped member that affixes to the base plate 10 while enclosing the blade members 20 and the driving ring 30 between itself and the base plate 10.

The cover 40 is provided with a through hole 40a, a rotating axial support hole 40b and a driving protrusion support hole 40c. The through hole 40a communicates with the aperture 10a at the center. The rotating axial support hole 40b supports the ends of the supporting axes 10d which pass through each of the blade members 20. The driving protrusion support hole 40c supports arc-shaped reciprocating movement of the driving pins 30c, which are inserted loosely through the blade members 20.

Also, the cover 40 is provided with a sensor mating hole 40d which functions as a through hole. The sensor mating hole 40d mates with and fixes to a rotational position sensor 41 which detects the position in the direction of rotation of the driving ring 30 and the permanent magnet 31.

The rotational position sensor 41 is a Hall sensor, which detects the magnetic field of the permanent magnet 31 using the Hall effect.

When the camera blade drive device 1 is attached to a camera or other device, the rotational position sensor 41 is connected electrically to a control circuit not shown here, and sends to the control circuit an electrical signal in response to the strength of the magnetic field of the permanent magnet 31.

Next is a detailed explanation of the special operation and effect of the camera blade drive device 1 in the configuration described above.

First, the default condition is the non-conducting condition, in which no electrical current is conducted to the coils 11. In this condition, magnetic force attracts the permanent magnet 31 to the magnetic members 12 of the base plate 10 (Refer to FIG. 6 (a).), and the driving ring 30 rotates in one direction (counterclockwise, according to the example in the drawings). And the plurality of blade members 20 each rotate in the closing direction (clockwise, according to the example in the drawings) by the driving pins 30c of the rotating driving ring 30. Therefore, the aperture 10a is fully closed by the light-blocking parts 20b of the plurality of the blade members 20 (Refer to FIG. 2).

In this fully-closed condition, some of the plurality of blade members 20 (three, according to the example in the drawings) touch the regulating parts 10f and are held in a stable static condition.

In this condition, the other blade members 20 that do not touch the regulating parts 10f (two, according to the example in the drawings) are held in a static condition by engaging with driving ring 30, which has stopped rotating.

Also, when the coils 11 are conducting, the driving ring 30 and the permanent magnet 31 rotate in the other direction (clockwise, according to the example in the drawings) by the magnetic field generated in the vicinity of the coils 11. And each of the plurality of blade members 20 rotates in the opening direction (counterclockwise, according to the example in the drawings) by the driving pins 30c of the rotating driving ring 30. Therefore, the aperture 10a that was closed by the plurality of blade members 20 is opened.

In this condition, the blade members 20 and the driving ring 30 can be stopped at a position that effects an arbitrary opening (open area) for the aperture 10a by appropriate control of the electrical force and electrical current polarity conducted to the coils 11 in response to a feedback signal of the rotational position sensor 41, as shown in FIG. 4.

Also, as shown in FIG. 5, when the plurality of blade members 20 are fully opened by conducting to the coils 11, one of the protruding parts 30a of the driving ring 30 touches the regulating parts 10e of the base plate 10 and is held fully-open in a stable static condition.

Also, reversing the current conducted to the coils 11 will return the plurality of the blade members 20 to the fully-closed condition. Or, effecting a non-conducting condition by not conducting to the coil 11 will also achieve the same effect.

In other words, by reversing the polarity of the electrical current conducted to the coils 11 to open the aperture, the electrical field generated in the vicinity of the coils 11 causes the driving ring 30 and the permanent magnet 31 to rotate in the above described one direction (counterclockwise, according to the example in the drawings), and allows the plurality of blade members 20 each to rotate in the closing direction (clockwise, according to the example in the drawings).

Also, by not conducting to the coil 11, magnetic attraction between the permanent magnet 31 and the magnetic members 12 causes the driving ring 30 and the permanent magnet 31 to rotate in the above described one direction (counterclockwise, according to the example in the drawings), and allows the plurality of blade members 20 each to rotate in the closing direction (clockwise, according to the example in the drawings).

Whether to perform the closing operation by reversing the polarity of the current or by not conducting current to the coils 11 can be determined based on the application of the camera blade drive device 1. For example, in the event that it is necessary to close the plurality of blade members 20 quickly, it is desirable to perform the closing operation by reversing the polarity of the current.

With the camera blade drive device 1 of this embodiment, the use of the permanent magnet 31, the coils 11, and the magnetic members 12 in a compact and simple structure not only enables the opening and closing of the plurality of blade members 20 but also enables these blade members 20 to be held in the fully-closed condition when non-conducting. Therefore, the application to a digital camera, digital video camera, or similar device of the camera blade drive device 1 enables protection of CCD, CMOS, and other components by fully-closing the blade members 20 when non-conducting.

Although the above-described embodiment is configured to hold the blade members 20 in the fully-closed condition when non-conducting, it is also possible to configure an embodiment to hold the blade members 20 in the fully-opened condition when non-conducting. In such a case, the magnetic members 12 is arranged to be near the opening rotation direction of the driving ring 30 (to the left, according to FIG. 6) at the coils 11.

In addition, as another example, it is also possible to configure an embodiment to hold the blade members 20 in a partially-opened condition when non-conducting. In such a case, the magnetic members 12 can be provided at or near the centers of the coils 11, as necessary to achieve the desired opening of the blade members 20.

Also, according to the embodiment described above, two groups of the permanent magnet 31, the coils 11, and the magnetic members 12 are provided around the circumference of the driving ring 30, but in other examples it would be possible to use only one group or three or more groups.

In particular, in order to achieve high torque from a relatively compact configuration, it is desirable to provide two or more groups of the permanent magnet 31, the coils 11, and the magnetic members 12. In such a case, in order to improve rotation balance for the driving ring 30, it is desirable that at least one group from the plurality of groups of the permanent magnet 31, the coils 11, and the magnetic members 12 be provided on the opposite side of the aperture 10*a* from another group and in a location that does not interfere with the support points for the blade members 20 (supporting axes 10*d*).

Also, according to the embodiment described above, the magnetic members 12 were made of magnetic bodies, but in other embodiments, the magnetic members 12 could be made of synthetic resin materials or rubber materials that include magnetic bodies. In addition, as another example of the magnetic members 12, other permanent magnets could be used with their polarity arranged to attract the permanent magnet 31 of the driving ring 30.

Also, the camera blade drive device related to the present invention was presented according to the above-mentioned embodiment in a preferred example, as a diagram device for a camera. As another example, it is also possible to apply the device as a camera shutter device.

Also, the camera blade drive device related to the present invention, as shown in FIG. 7, can be applied to a surveillance camera 100.

The surveillance camera 100 includes a main unit 110, a front lens group 120 and a rear lens group 130 provided at the front of the main unit 110, and a camera blade drive device 140 of the above-mentioned configuration provided between the front lens group 120 and the rear lens group 130. The surveillance camera 100 is installed on either the interior or exterior of a building and used to perform surveillance of individuals exhibiting suspicious behavior as well as other individuals, animals, and objects as a part of crime prevention, disaster prevention, measurement, or recordkeeping activities.

In this configuration of the surveillance camera 100, light that has passed through the front lens group 120 also passes through the camera blade drive device 140 and the rear lens group 130 before entering the main unit 110, where it is converted to electric signals by imaging elements inside the main unit 110.

The main unit 110, according to the example in the drawings, is in the form of a rectangular box. Inside of the main unit 110, circuits such as a control circuit for controlling the camera blade drive device 140 or a transmission circuit for transmitting to a surveillance computer or other device image data in the form of the electric signals are provided.

According to the example shown in FIG. 7, the camera blade drive device 140 is arranged so as to be sandwiched between the front lens group 120 and the rear lens group 130. As another example, it is also possible to arrange the camera blade drive device 140 in front of the front lens group 120 or behind the rear lens group 130 as well as to arrange it in the midst of or to either side of combinations of lens groups other than those shown in the drawings.

EXPLANATION OF SYMBOLS

1: Camera blade drive device
10: Base plate
10*a*: Aperture
10*d*: Supporting axis (blade member support point)
11: Coil
12: Magnetic member
20: Blade member
30: Driving ring
31: Permanent magnet
41: Rotational position sensor

What is claimed is:

1. A camera blade drive device comprising
a base plate having an aperture for an optical path;
a blade member that is supported by the base plate and operates so as to open and close the aperture; and
a driving ring configured to rotate relative to the base plate,
wherein the blade member is linked to the driving ring and operated by rotation of the driving ring,
wherein the driving ring is provided with a permanent magnet,
wherein the base plate is provided with a coil operable to generate an electromagnetic force by conducting,
wherein the base plate is provided with a magnetic member operable to attract the permanent magnet and hold the driving ring in a predetermined position by a magnetic force generated between the permanent magnet and the magnetic member when the coil is non-conducting, and
wherein the coil is operable to generate an electromagnetic force which displaces the permanent magnet along a circumferential direction of the driving ring when the coil is conducting.

2. The camera blade drive device of claim 1, wherein the permanent magnet is attracted by the magnetic member and the blade member is held in either a fully-closed or fully-opened condition when the coil is non-conducting.

3. The camera blade drive device of claim 2, further comprising a regulating part provided on the base plate,
wherein the operation of the blade member in either an opening or closing direction is regulated by the regulating part, and the blade member is held in either a fully-closed or fully-opened condition when the coil is non-onducting.

4. The camera blade drive device of claim 1, wherein the permanent magnet is disposed at the circumference of the driving ring.

5. A camera blade drive device comprising:
a base plate having an aperture for an optical path;
a blade member that is supported by the base plate and operates so as to open and close the aperture; and
a driving ring configured to rotate relative to the base plate,
wherein the blade member is linked to the driving ring and operated by rotation of the driving ring,
wherein the driving ring is provided with a plurality of permanent magnets, wherein the base plate is provided with a plurality of coils operable to generate an electromagnetic force by conducting, wherein the base plate is provided with a plurality of magnetic members operable to attract the permanent magnets, respectively, and hold the driving ring in a predetermined position by a magnetic force generated between the permanent magnets and the magnetic members when the coil is non-conducting, wherein the plurality of permanent magnets, the plurality of coils, and the plurality of magnetic members are arranged in at least two groups, each group having one of the permanent magnets, one of the coils, and one of the magnetic members, and the at least two groups being spaced apart from each other along the circumferential direction of the driving ring, and wherein the coils are operable to generate an electromagnetic force which displaces the permanent magnets, respectively, along the circumferential direction of the driving ring when the coil is conducting.

6. The camera blade drive device of claim 5, wherein the permanent magnet is attracted by the magnetic member and the blade member is held in either a fully-closed or fully-opened condition when the coil is non-conducting.

7. The camera blade drive device of claim 6, further comprising a regulating part provided on the base plate, wherein the operation of the blade member in either an opening or closing direction is regulated by the regulating part, and the blade member is held in either a fully-closed or fully-opened condition when the coil is non-conducting.

8. The camera blade drive device of claim 5, wherein the at least two groups are provided on opposing sides of the aperture, and each of the groups does not interfere with a support point of the blade member.

9. The camera blade drive device of claim 8, wherein the permanent magnet is attracted by the magnetic member and the blade member is held in either a fully-closed or fully-opened condition when the coil is non-conducting.

10. The camera blade drive device of claim 9, further comprising a regulating part provided on the base plate, wherein the operation of the blade member in either an opening or closing direction is regulated by the regulating part, and the blade member is held in either a fully-closed or fully-opened condition when the coil is non-conducting.

11. The camera blade drive device of claim 5, further comprising a regulating part provided on the base plate, wherein the operation of the blade member in either an opening or closing direction is regulated by the regulating part, and the blade member is held in either a fully-closed or fully-opened condition when the coil is non-conducting.

* * * * *